United States Patent
Matsuura et al.

(10) Patent No.: US 7,185,912 B2
(45) Date of Patent: Mar. 6, 2007

(54) KNEE PROTECTION AIRBAG DEVICE

(75) Inventors: Hirokazu Matsuura, Aichi-ken (JP); Atsushi Nagata, Aichi-ken (JP); Yoshio Mizuno, Aichi-ken (JP); Kazumasa Suzuki, Aichi-ken (JP); Kazuhiro Nakayama, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 230 days.

(21) Appl. No.: 10/602,689

(22) Filed: Jun. 25, 2003

(65) Prior Publication Data
US 2005/0073134 A1  Apr. 7, 2005

(30) Foreign Application Priority Data
Jul. 18, 2002  (JP)  ............... 2002-209969

(51) Int. Cl.
*B60R 21/215* (2006.01)
(52) U.S. Cl. ................. 280/728.3; 280/730.1
(58) Field of Classification Search ............ 280/728.3, 280/730.1, 731, 732
See application file for complete search history.

(56) References Cited

U.S. PATENT DOCUMENTS

| 3,784,223 | A | * | 1/1974 | Hass et al. | ............... | 280/730.1 |
| 5,183,288 | A | * | 2/1993 | Inada et al. | ............... | 280/732 |
| 5,536,043 | A | * | 7/1996 | Lang et al. | ............... | 280/753 |
| 5,904,367 | A | * | 5/1999 | Warnez et al. | ............ | 280/728.3 |
| 6,024,377 | A |   | 2/2000 | Lane, Jr. | | |
| 6,616,182 | B2 | * | 9/2003 | Woolley et al. | ........... | 280/732 |
| 2002/0171231 | A1 | * | 11/2002 | Takimoto et al. | ....... | 280/730.1 |
| 2004/0026903 | A1 |   | 2/2004 | Abe | | |

FOREIGN PATENT DOCUMENTS

| DE | 43 01 933 A1 | 8/1993 |
| GB | 2 263 671 A | 8/1993 |
| JP | A-9-123863 | 5/1997 |
| JP | A-H09-123862 | 5/1997 |
| JP | A-2002-347566 | 12/2002 |

OTHER PUBLICATIONS

Office Action from Japanese Patent Office issued on Aug. 24, 2006 for the corresponding Japanese patent application No. 2002-209969 (a copy thereof).

* cited by examiner

*Primary Examiner*—David R. Dunn
(74) *Attorney, Agent, or Firm*—Posz Law Group, PLC

(57) ABSTRACT

In the knee protection airbag device of the present invention, an airbag folded and housed in a case opened rearward of the vehicle pushes open the door portion of an airbag cover assembled with the case, upon inflow of inflation gas from the inflator. Around the airbag cover, there is arranged an interior decoration member for vehicle which is provided separate from the airbag cover. The door portion includes at least an upper door openable upward. The upper door is formed in such a size as to cover a gap formed between the interior decoration member and the airbag cover when opened upon deployment of the airbag.

5 Claims, 9 Drawing Sheets

KNEE PROTECTION AIRBAG DEVICE

The present application claims priority to Japanese Patent Application of Matsuura et al., filed Jul. 18, 2002, under No. 2002-209969, its entirety is hereby incorporated into the present application by this reference.

BACKGROUND OF THE INVENTION

1. Field of the Invention

The present invention relates to a knee protection airbag device which protects the knees of a seated vehicle occupant with an airbag expanding and inflating by admitting inflation gas.

2. Description of Related Art

In the prior art, Japanese Patent Laid-Open No. Hei 9-123863 shows a device for protecting the knees of a vehicle occupant. This prior art illustrates a device located below the column cover to protect the knees of a driver with an expanding and inflating airbag. This device includes a case opened rearward for housing the folded airbag, and an airbag cover covering the case opening and including a door portion openable upon airbag deployment. The airbag cover is assembled with the case. Around the airbag cover, there is separately arranged an interior decoration member of a vehicle. The door portion includes an upper door openable upward and a lower door openable downward.

In an airbag device of this kind, when the airbag protrudes rearward of the vehicle by admitting inflation gas from the inflator, a great reaction force forward of the vehicle is applied to the case. Because of this reaction force, the case is likely to move forward of the vehicle together with the airbag cover, thereby causing a gap between the airbag cover and the interior decoration member. The airbag expanding and inflating may go into this gap.

It is conceivable to stiffen the case itself to suppress the movement of the case. However, it causes the weight increase of the case, and further of the entire airbag device, which goes against the recent needs for the weight reduction of a vehicle.

SUMMARY OF THE INVENTION

It is an object of the present invention to provide an airbag device for knee protection capable of protecting the occupant's knees properly without having the expanding and inflating airbag go into the gap between the airbag cover and the interior decoration member while achieving the weight reduction.

The object of the present invention is achieved by a knee protection airbag device with the construction below:

The knee protection airbag device is arranged in front of the knees of a seated vehicle occupant, the airbag device includes:
- a case opened rearward of the vehicle for housing the folded airbag and the inflator for supplying the airbag with inflation gas;
- an airbag cover assembled with the case, the airbag cover comprising a door portion covering the opening of the case, the door portion openable upon deployment of the airbag; and
- an interior decoration member for vehicle provided separate from the airbag cover, the interior decoration member being arranged around the airbag cover;
- whereby the airbag, upon inflow of inflation gas from the inflator, pushes open the door portion, and expands and inflates upward while protruding rearward of the vehicle; and
- the door portion including at least an upper door openable upward;
- the upper door having the dimension thereof enough to cover a gap formed between the interior decoration member and the airbag cover when opened upon deployment of the airbag.

In the knee protection airbag device constructed as above, even if the great reaction force shifts the case forward of the vehicle upon deployment of the airbag to cause a gap between the interior decoration member and the airbag cover, the airbag does not go into this gap in course of deployment, since the upper door of the airbag cover is formed in such a size as to cover the gap. Therefore, the airbag expands and inflates while protruding rearward from the case opening.

In the airbag device of the present invention, the airbag is enabled to deploy to properly protect the knees of the occupant merely by setting the dimension of the upper door of the airbag cover as described above. In other words, the expanding property of the airbag is improved by the design change of the upper door, not by stiffening the case itself to suppress the movement of the case. In the knee protection airbag device of the present invention, as a result, the expanding property of the airbag is improved without increasing the weight of the airbag device.

Therefore, the knee protection airbag device of the present invention is able to protect the knees of the occupant properly without having the airbag expanding and inflating go in between the airbag cover and the interior decoration member, while achieving the weight reduction.

In the knee protection airbag device constructed as above, it is desired that the door portion include, below the upper door, a lower door openable downward upon deployment of the airbag.

With this construction, the two upper and lower doors arranged up and down open simultaneously when the airbag is deployed, thereby providing an opening quickly compared with the construction having only one door. As a result, the airbag is able to expand quickly.

With the above construction, moreover, since the door portion is composed of two members of the upper door and the lower door, the substantial width of the door portion in the longitudinal direction of the vehicle when opened is reduced. As a result, it is possible to suppress the degree of protrusion of the door portion opened toward the occupant.

Furthermore, it is desired that the airbag cover include a general portion arranged around the door portion, and that the interior decoration member be extended to a position at the vehicle's rearward of the general portion so as to be supported by the general portion.

With this construction, the interior decoration member is supported at the vehicle's front side face by the general portion of the airbag cover. Therefore, the interior decoration member is prevented from depressing toward the vehicle's front side in normal time, thereby improving the appearance of the interior side of the vehicle.

DESCRIPTION OF THE PREFERRED EMBODIMENTS

An embodiment of the present invention is described below with reference to the accompanying drawings. In addition, the invention is not limited to the embodiment. All modifications within the requirements of the claims and equivalents with respect to the requirements should be included in the scope of the claims.

Figure 1:
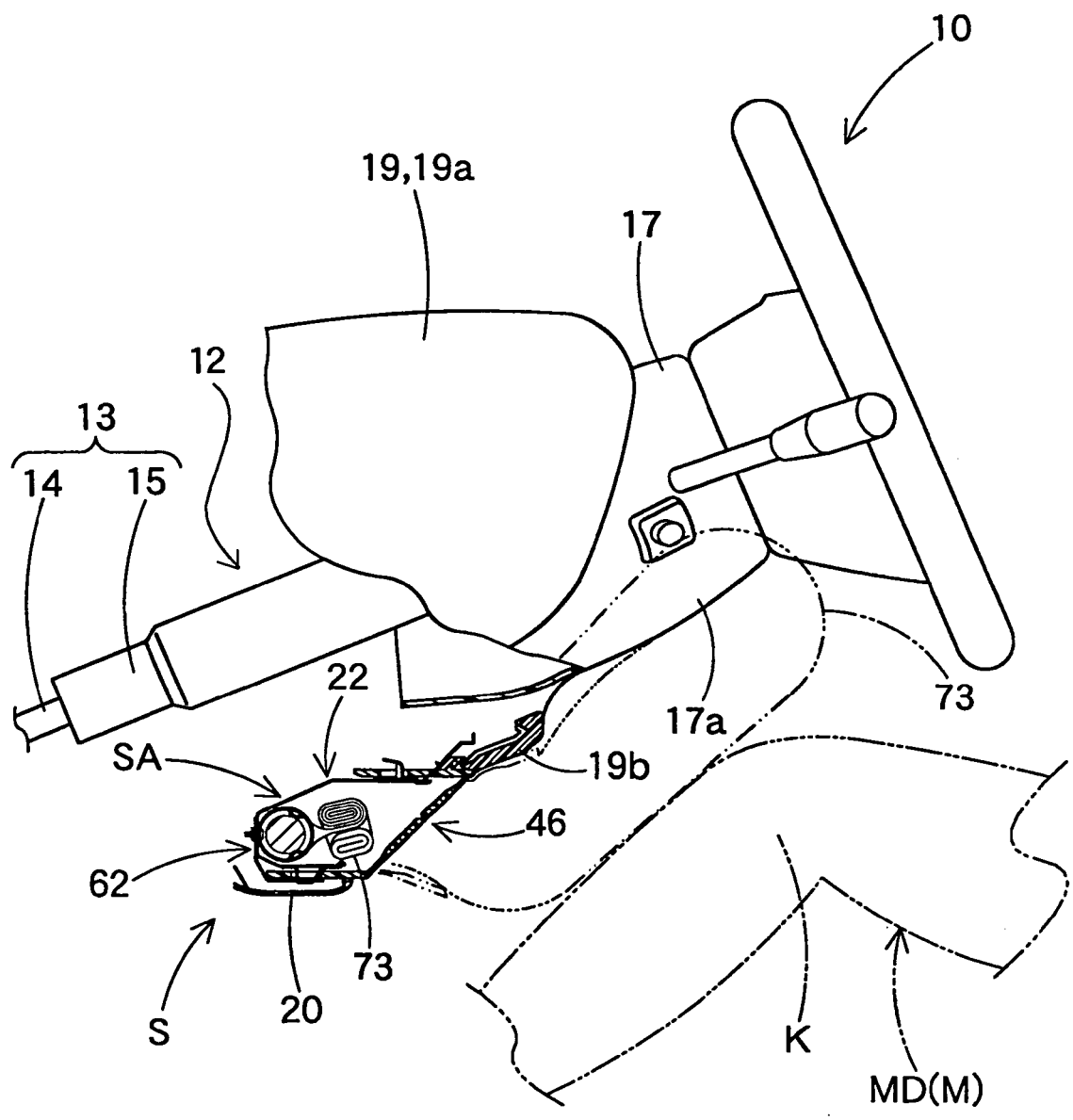
FIG. 1 is a schematic vertical section of an embodiment of the knee protection airbag device according to the present invention in deployment, taken along the longitudinal direction of the vehicle.
Figure 6:
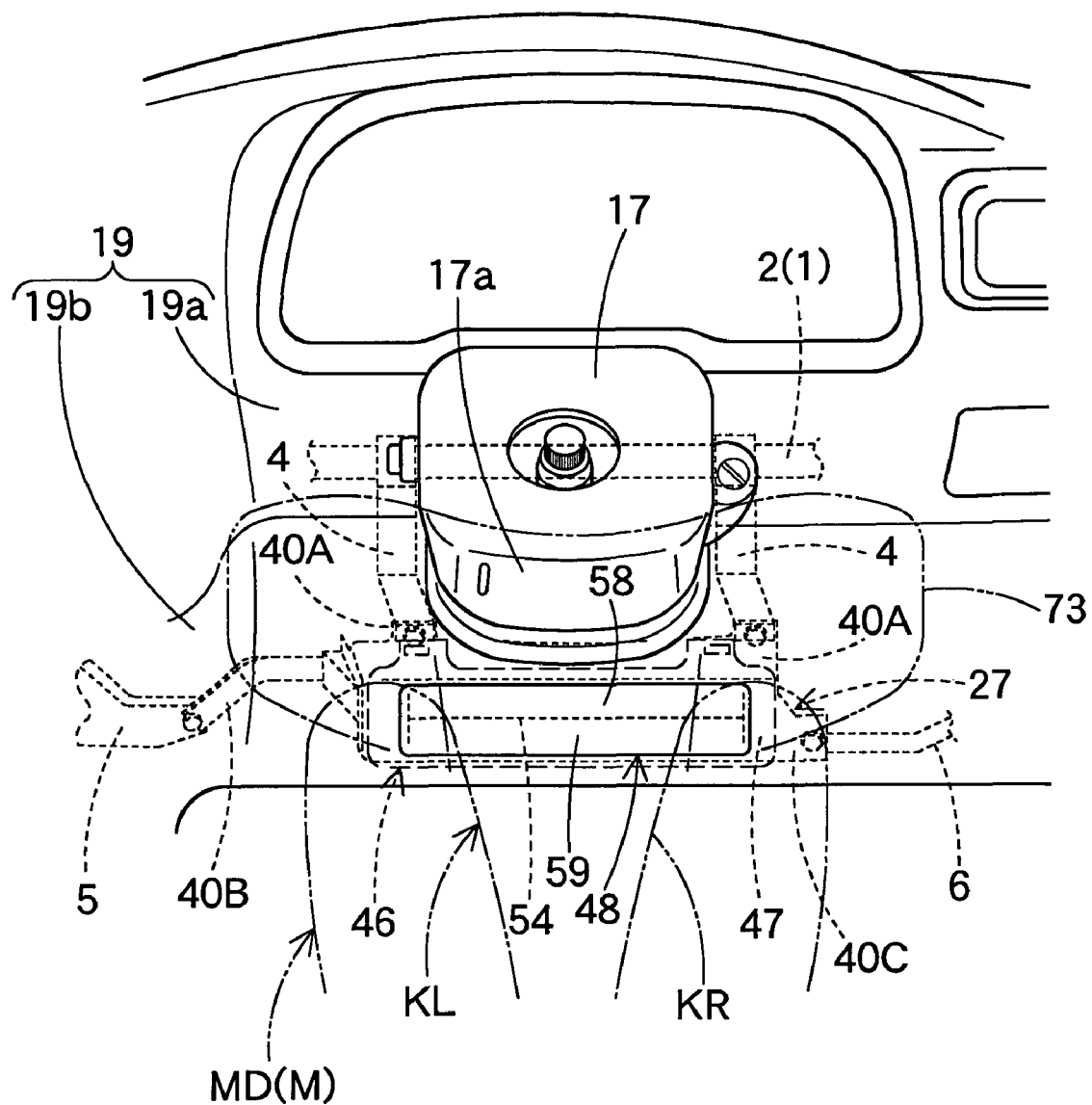
FIG. 6 is a schematic front view of the embodiment of the knee protection airbag device in deployment, as viewed from the rear side of the vehicle.

As shown in FIGS. 1 and 6, the knee protection airbag device S of the embodiment is arranged below the steering column 12 in front of a driver MD as an occupant M for protecting the knees K of the driver MD.

Here, up-down, left-right, and front-rear in this specification correspond to the up-down, left-right, and front-rear of the vehicle as the knee protection airbag device S is mounted on the vehicle.

As shown in FIG. 1, the steering column 12 includes a column body 13 connected to the steering wheel 10, and a column cover 17 covering the column body 13 at the lower side of the steering wheel 10. The column body 13 includes a main shaft 14 and a column tube 15 covering the main shaft 14.

The column cover 17 is formed of synthetic resin into a generally square cylindrical shape, and is so arranged along the axial direction of the column body 13 as to cover the column body 13. The rear surface 17a of a portion of the column cover 17 protruded from the instrument panel (as called "dashboard" hereinafater) 19 has a generally rectangular shape and is curved to ascend backward in the longitudinal direction of the vehicle.

The knee protection airbag device S includes: a folded airbag 73; an inflator 62 for supplying the airbag 73 with inflation gas; a case 22 opened rearward for housing the folded airbag 73 and the inflator 62; and an airbag cover 46 covering the vehicle's rear side of the opening 23a of the case 22.

As shown in FIGS. 1 to 6, the case 22 is made of a sheet metal, and is located below the steering column 12. The case 22 includes a case body 23 and a support member 27 each of which is formed separately. The case body 23 and the support member 27 are integrated by securing the later-described attachment portion 32 of the support member 27 to the later-described side wall portion 24 of the case body 23 by welding.

Figure 3:
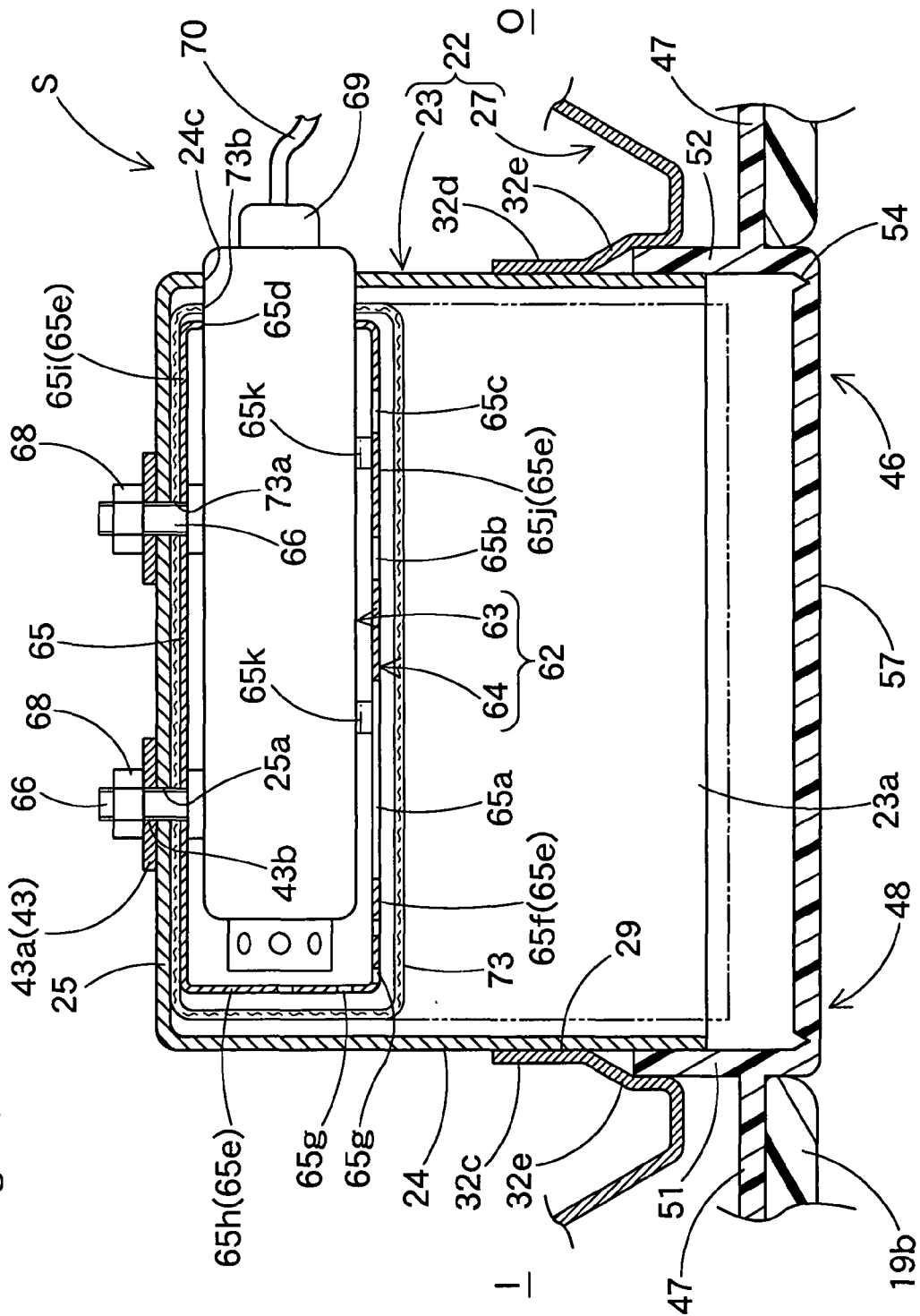
FIG. 3 is a schematic section taken along the line III—III of FIG. 2.
Figure 4:
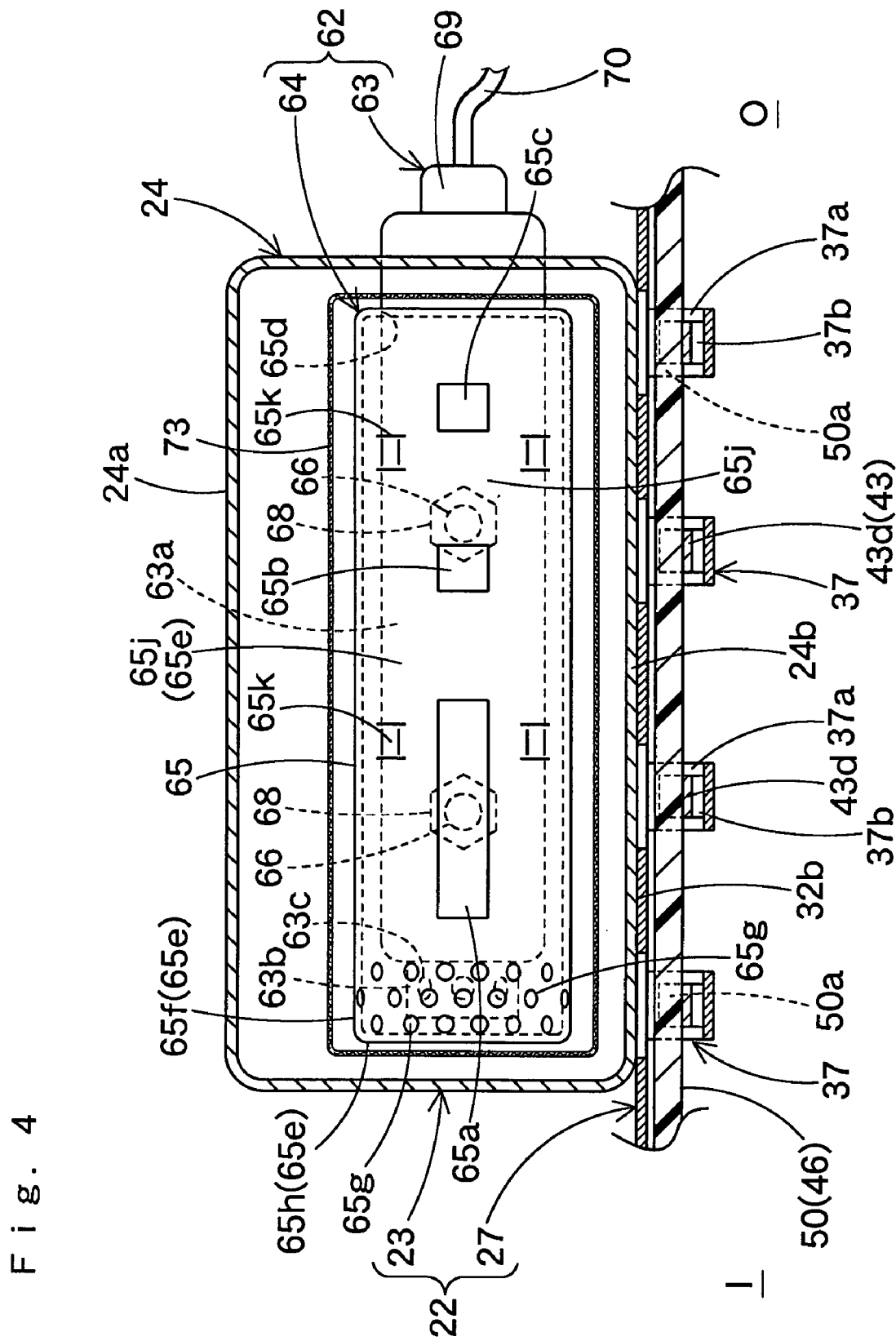
FIG. 4 is a schematic section taken along the line IV—IV of FIG. 2.
Figure 5:
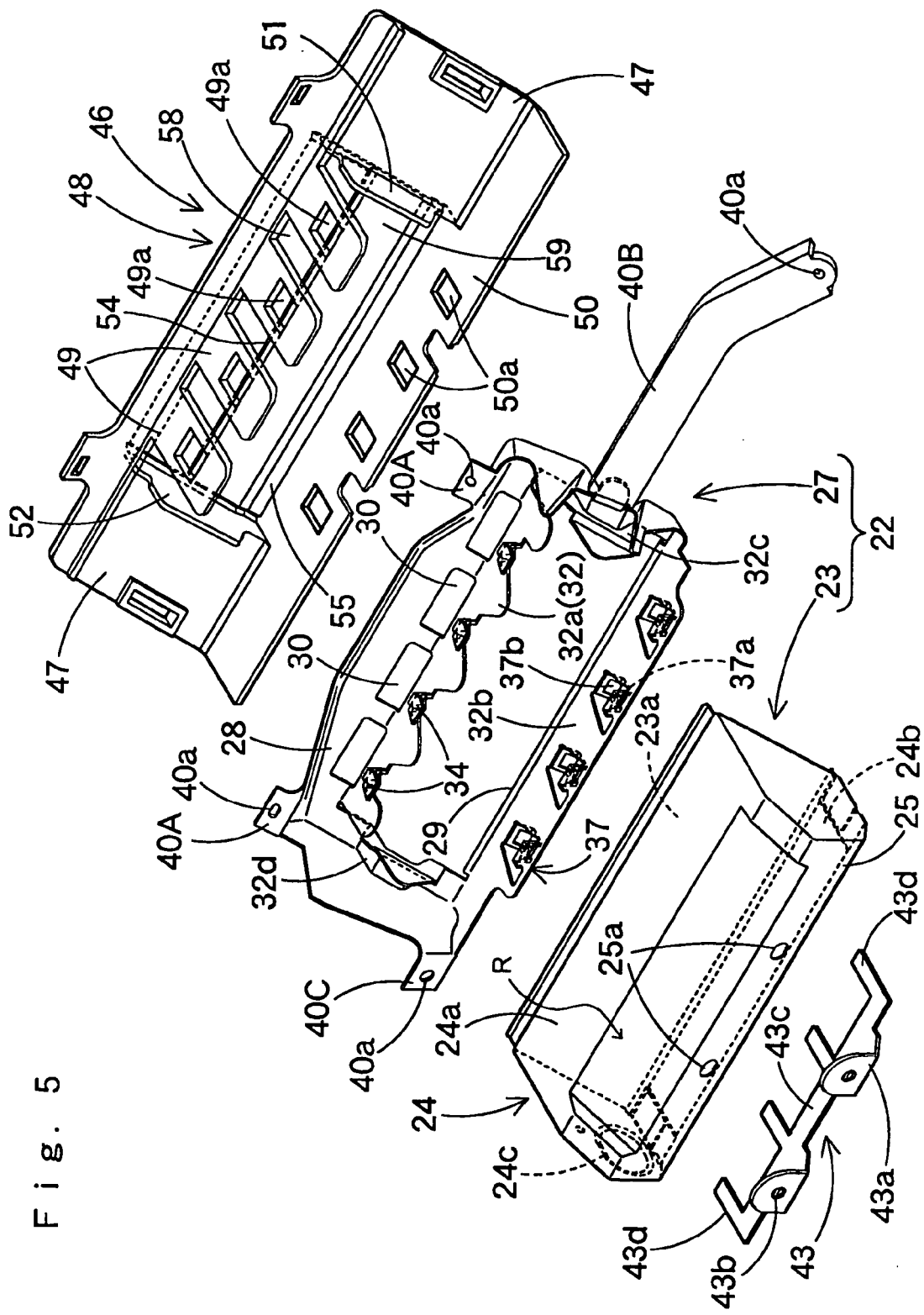
FIG. 5 shows exploded rear perspective views of a case and an airbag cover used in the embodiment.

The case body 23 includes a side wall portion 24 of a generally square cylindrical shape opened rearward of the vehicle, and a bottom wall 25 closing the vehicle's front side of the side wall portion 24. The case body 23 is so arranged that the axial direction of the side wall portion 24 be generally horizontal. The opening plane of the side wall portion 24 is slanted so that the lower side is located forward of the upper side. In the embodiment, more specifically, with respect to the upper wall 24a and the lower wall 24b in the side wall portion 24, which confront each other in the vertical direction, the vehicle's longitudinal dimension of the upper wall 24a is set greater than that of the lower wall 24b, so that the upper wall 24a in the side wall portion 24 protrudes rearward relative to the lower wall 24b. In the side wall portion 24, there is formed an insert hole 24c for the end of the later-described inflator body 63, as shown in FIGS. 3 and 4. In the bottom wall 25, there are formed insert holes 25a for receiving the later-described bolts 66 of the inflator 62. A recessed section R is formed in the case body 23, and the recessed section R includes a recess that extends between the bottom wall 25 and the upper wall 24a as shown in FIG. 5. The recessed section R generally faces the steering column as shown in FIG. 5.

The support member 27 is adapted to support the vehicle's front side of the airbag 73 when the airbag 73 is deployed. As shown in FIG. 5, the support member 27 includes a body 28, mounting portions 40 for securing the case 22 to the vehicular body 1, and retaining portions 34 and 37 to which the airbag cover 46 is assembled.

The body 28 has a generally rectangular plate shape extended from the peripheral edge of the opening 23a of the case body 23. The body 28 includes a fitting hole 29 at a position corresponding to the opening 23a of the case body 23. The fitting hole 29 communicates with the opening 23a and allows the peripheral portion of the opening 23a of the side wall portion 24 of the case body 23 to fit therein. Around the fitting hole 29, there is arranged an attachment portion 32 projected toward the vehicle's front side and to be attached to the outer surface of the side wall portion 24 in the vicinity of the opening 23a. In the embodiment, the attachment portion 32 is arranged over the entire circumference of the fitting hole 29. Here in the embodiment, the left and right portions 32c and 32d out of the attachment portion 32 are attached to the side wall portion 24 at their leading end sides. More specifically, the portions 32c and 32d have gaps, respectively, between their root side part 32e and the side wall portion 24, as shown in FIG. 3. The later-described left and right side walls 51 and 52 of the airbag cover 46 are to be disposed between these gaps between the root side part 32e and the side wall portion 24. In the body 28 above the fitting hole 29, there are formed a plurality of through holes 30 (four, in the embodiment) opened generally in rectangular shapes. The later-described joint pieces 49 of the airbag cover 46 are to be inserted through these through holes 30.

Referring back to FIG. 5, the retaining portions 34 and 37 are extendedly formed from the portions 32a and 32b of the attachment portion 32 to be attached to the upper wall 24a and the lower wall 24b, respectively, of the side all portion 24. The retaining pawls 34 as a retaining portion are disposed on the portion 32a toward the upper wall 24a. The retaining projections 37 as a retaining portion are disposed on the portion 32b toward the lower wall 24b.

The retaining pawls 34 are projected upward from the attachment portion 32a and have their leading ends 34a bent toward the bottom wall 25 and away from the opening 23a of the case body 23, thereby each having a generally L-shaped section. The retaining pawls 34 are formed in plurality (there are four, in the embodiment) along the transverse direction of the vehicle. The retaining pawls 34 retain the peripheral edges of the retaining holes 49a formed in the joint pieces 49 of the airbag cover 46 by the leading ends 34a.

The retaining projections 37 are projected downward from the attachment portion 32b toward the lower wall 24b of the side wall portion 24, and are formed in plurality (there are four, in the embodiment) along the transverse direction of the vehicle. Each of the retaining projections 37 is to be inserted into each of the retaining holes 50a formed in the later-described joint piece 50 of the airbag cover 46. At this time, a holding member 43 (refer to FIG. 5) formed separately from the support member 27 helps the retaining projections 37 to be joined to the retaining holes 50a. Each of the retaining projections 37 includes a protrusion 37a to be protruded downward from the joint piece 50. Each of the protrusions 37a is provided with an insert hole 37b gone through in the front-rear direction which the insert portion 43b of the holding member 43 is inserted into.

The holding member 43 is made of a sheet metal, and includes two vertical plate portions 43a and a horizontal plate portion 43c extended rearward of the vehicle from the lower ends of the vertical plate portions 43a, thereby having a generally L-shaped section. The holding member 43 is located at the lower side of the case body 23. Each of the vertical plate portions 43a includes a mounting hole 43b for inserting through the bolt 66 of the inflator 62. In the horizontal plate portion 43c, there are formed in a comb teeth fashion a plurality of insert portions 43d to be inserted into the insert holes 37b in the protrusion 37a of the retaining projections 37. More specifically, the holding member 43 is used to prevent the individual retaining projections 37 from coming off from the retaining holes 50a by inserting the individual insert portions 43d into the individual insert holes 37b to be fixed like a locking bar between the protrusions 37a of the retaining projections 37 and the joint pieces 50. The holding member 43 is further secured to the case body 23 together with the inflator 62 by means of the bolts 66 and nuts 68 for fixing the inflator 62 to the case body 23.

In the embodiment, the mounting portions 40 are formed at the four corners in the peripheral edge of the body 28. Each of the mounting portions 40 is provided with a mounting hole 40a for the bolt-fixing to the side of the body 1. At the side of the body 1 to which the individual mounting portions 40 are to be attached, there are provided brackets 4, 5 and 6 as shown in FIG. 6. The brackets 4 and 4 for the attachment of the upper side mounting portions 40A and 40A are connected to the dashboard reinforcement 2 on the side of the body 1. The brackets 5 and 6 for the attachment of the lower side mounting portions 40B and 40C are connected to the not-shown center brace or front body pillar or the like on the side of the body 1. In the embodiment, the mounting portion 40B is formed separately from the body 28, and is integrated with the body 28 by being welded and secured at its end, as shown in FIG. 5.

The airbag cover 46 is formed of thermo-plastic elastomer of polyolefine or the like for covering the vehicle's rear side of the case opening 23a. The airbag cover 46 is an independent part of the dashboard 19 as an interior decoration member, and is located closer to the lower panel 19b of the dashboard 19 in the periphery of the column cover 17. Here, the dashboard 19 is composed of an upper panel 19a and the lower panel 19b. The airbag cover 46 includes a door arrangement portion 48 located in the vicinity of the opening 23a of the case 22, and a general portion 47 arranged in the peripheral edge of the door arrangement portion 48.

Around the door arrangement portion 48 and neighboring the door arrangement portion 48, there is arranged a lower panel 19b. In the embodiment, the door arrangement portion 48 and the lower panel 19b are arranged to be generally flush at the vehicle's rearward surfaces, as shown in FIG. 3. The door arrangement portion 48 includes a door portion 57 and upper side walls 49, and each one lower, left and right side wall 50, 51 and 52 disposed in the circumferential edge of the door portion 57.

The door portion 57 is formed in a generally rectangular plate shape slightly larger than the opening 23a of the case 22, and covers the opening 23a. In the embodiment, the door portion 57 includes two doors, i.e., an upper door 58 openable upward, and a lower door 59 openable downward. More particularly, the door portion 57 includes hinge lines 55 at the upper and lower ends around which the upper and lower doors 58 and 59 open, and weakened breakable portions 54 around the upper and lower doors 58 and 59, having a generally H-shape as viewed from the rear side of the vehicle.

Figure 2:
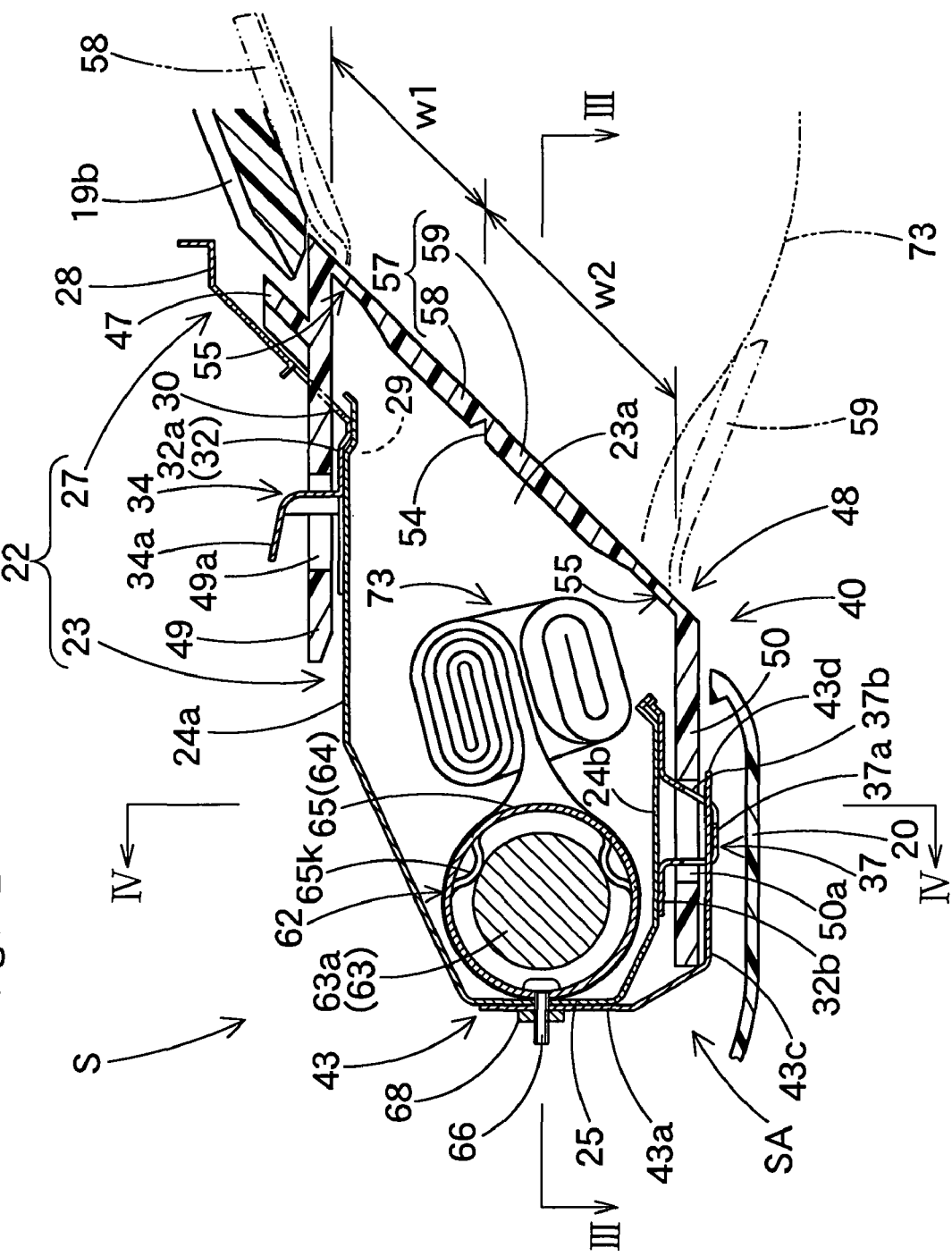
FIG. 2 is a schematic enlarged vertical section of the embodiment of the knee protection airbag device, taken along the longitudinal direction of the vehicle.
Figure 7:
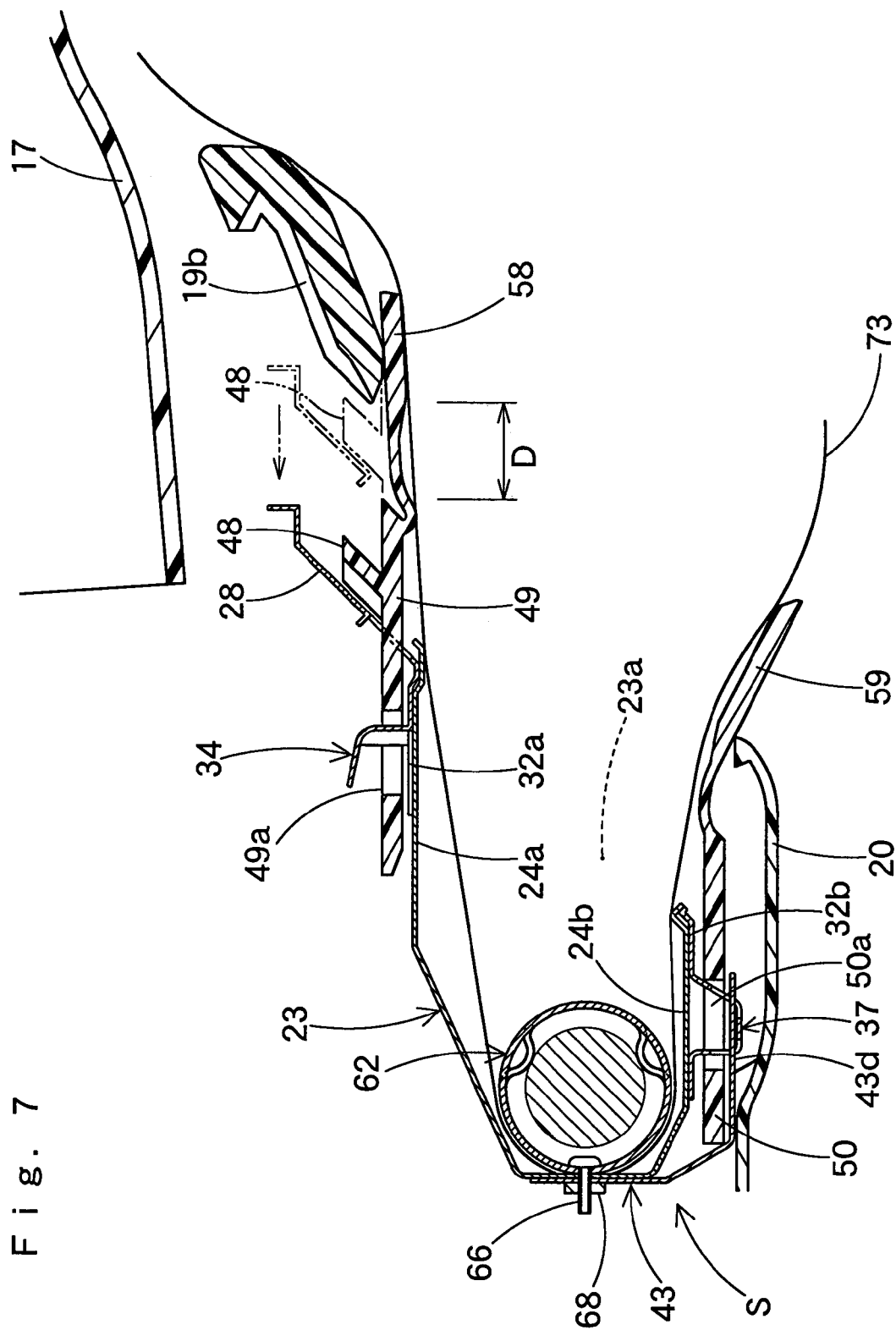
FIG. 7 is a schematic vertical section of the airbag of the embodiment completely deployed, taken along the longitudinal direction of the vehicle.

As shown in FIGS. 2 and 7, the vertical dimension w1 of the upper door 58, when opened upon airbag 73 deployment, is so set as to close the gap D between the lower panel 19b and the general portion 47 of the airbag cover 46 which may be caused by the case 22 and the airbag cover 46 moving forward of the vehicle. In the embodiment, moreover, the vertical dimension w1 of the upper door 58 is set smaller than the vertical dimension w2 of the lower door 59.

The upper side wall 49, the lower side wall 50, the left side wall 51 and the right side wall 52 protrude forward of the vehicle so as to neighbor the outer circumference of the side wall portion 24 of the case body 23. The upper side walls 49 disposed close to the upper wall 24a and the lower side wall 50 disposed close to the lower wall 24b function as the joint pieces to join the airbag cover 46 to the case 22. In the embodiment, the upper and lower side walls 49 and 50 are to be placed outward of the attachment portions 32a and 32b of the support member 27, and the left and right side walls 51 and 52 are to be placed between the side wall portion 24 of the case body 23 and the root side portions 32e of the attachment portions 32c and 32d of the support member 27 (refer to FIGS. 2 and 3).

Corresponding to the retaining pawls 34, a plurality (four, in the embodiment) of the upper side walls 49 as the joint pieces are arranged along the transverse direction, and each of them is provided with a retaining hole 49a opened in a generally rectangular shape for retaining the retaining pawl 34. The transverse width of each of the upper side walls 49 is so set as to be inserted into each of the through holes 30 of the support member 27. The lower side wall 50 as the joint piece has a generally rectangular plate shape, and is provided with a plurality (four, in the embodiment) of retaining holes 50a opened respectively in a generally rectangular shape for retaining the retaining projections 37.

As shown in FIGS. 2 and 3, the general portion 47 is formed at a position recessed forward of the vehicle from the door arrangement portion 48 by the thickness of the lower panel 19b so as not to engage the lower panel 19b arranged around the door arrangement portion 48. In other words, the general portion 47 supports the vehicle's front side of the lower panel 19b at the vehicle's front side of the lower panel 19b. The lower panel 19b and the general portion 47 are fixed together by a clip or the like at a not-shown predetermined position.

As shown in FIGS. 2 to 4, the inflator 62 is a cylinder-type arranged so that its axial direction may be along the vehicle's transverse direction. The inflator includes a generally cylindrical body 63 and a diffuser 64 made of a sheet metal.

The body 63 is of a type which generates inflation gas by burning a predetermined gas generant in response to an actuating signal, and includes a cylindrical general portion 63a and a small diameter portion 63b projected from an end face of the general portion 63a which is directed toward the vehicle's inner side I as mounted on a vehicle. The body 63 is provided with a plurality of gas discharge ports 63c on the outer circumference of the small diameter portion 63b. A connecter 69 to which a lead wire 70 is connected for inputting an actuating signal is connected to the other end face of the general portion 63a away from the small diameter portion 63b (the end face toward the vehicle's outer side O as mounted on a vehicle).

The diffuser 64 includes a generally cylindrical holding cylinder 65 of a sheet metal for covering the inflator body 63, and a plurality (two, in the embodiment) of bolts 66 protruded forward of the vehicle from the holding cylinder 65. The holding cylinder 65 includes a cover portion 65e covering the circumferential side and the end face of the body 63 except the later-described gas outlet ports 65a, 65b and 65c and an insert hole 65d.

The gas outlet ports 65a, 65b and 65c are so provided as to guide the inflation gas discharged from the gas discharge ports 63c in the small diameter portion 63b of the body 63 toward the rear side of the vehicle. The gas outlet port 65a is opened in a rectangular shape long sideways, and is disposed on the vehicle's rear side face of the holding cylinder 65 as mounted on the vehicle, at a position closer to the gas discharge ports 63c, which is to the inner side I relative to the center of the axial direction of the body 63, but away from the small diameter portion 63b toward the outer side O so as not to cross the small diameter portion 63b in the direction perpendicular to the axis of the holding cylinder 65. The gas outlet ports 65b and 65c are individually opened in a generally square shape and have small opening areas than the gas outlet port 65a. The gas outlet ports 65b and 65c are disposed side by side along the vehicle's transverse direction on the vehicle's rear side face of the holding cylinder 65 as mounted on the vehicle, at the positions toward the vehicle's outer side O relative to the center of the axial direction of the body 63.

The insert hole 65d is disposed at the end face of the holding cylinder 65 toward the vehicle's outer side O, and is so opened that the general portion 63a of the body 63 may be inserted therethrough.

The cover portion 65e includes a covering cylinder 65f and a covering end face 65h. The covering cylinder 65f has a cylindrical shape, and covers around the gas outlet ports 63c of the small diameter portion 63b, or the circumferential direction of the inflator body 63 at the small diameter portion 63b. The covering end face 65h closes the end of the holding cylinder 65 at the vehicle's inner side I to cover the end of the inflator body 63 in the vicinity of the small diameter portion 63b. The vehicle's front side half of the cover portion 65e constitutes a covering half pipe 65i for covering the front side half of the inflator body 63. The portion between the gas outlet ports 65a, 65b and 65c in the vehicle's rear side of the cover portion 65e constitutes a remaining covering portion 65j. In the vehicle's rear side portion of the covering cylinder 65f and the covering end face 65h in the vicinity of the small diameter portion 63b, there are formed numbers of small holes 65g opened roundly, as shown in FIGS. 3 and 4.

Figure 8:
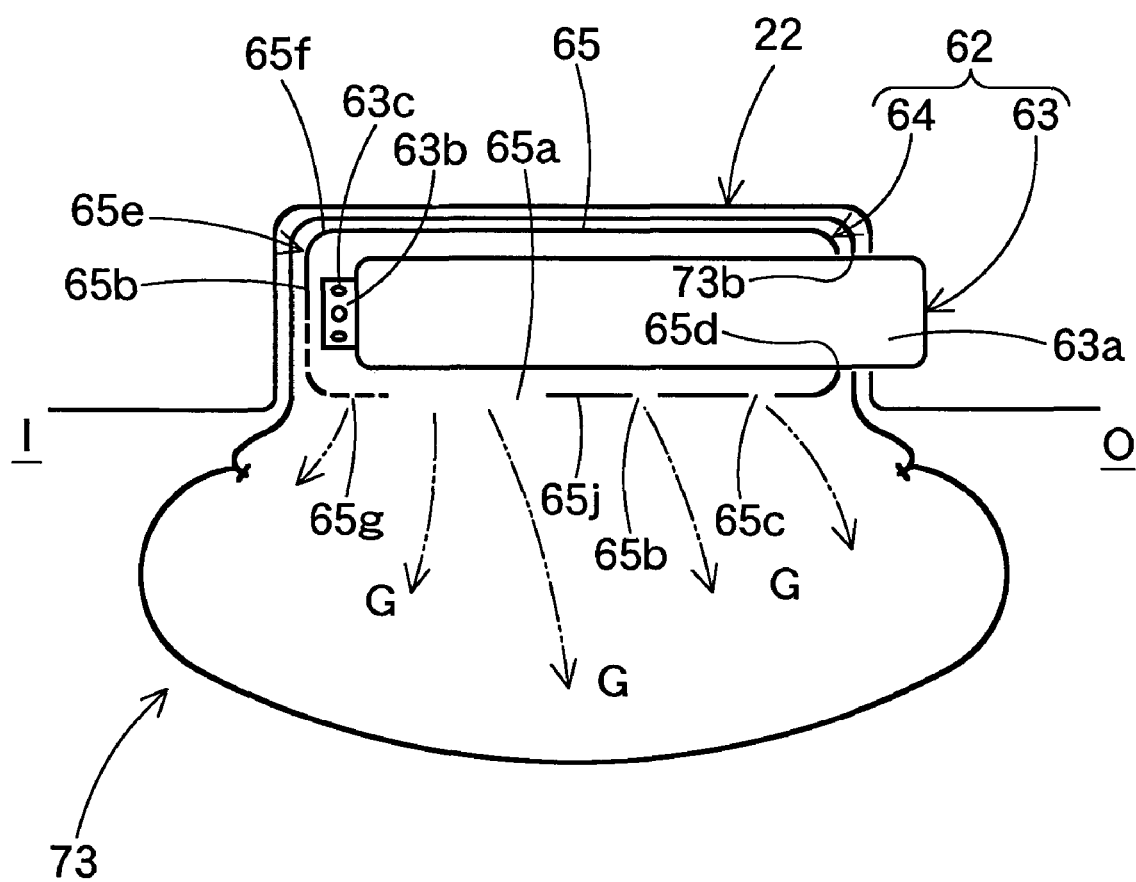
FIG. 8 schematically shows the flow of inflation gas in the embodiment when the inflator is actuated.

The opening area and the position of the gas outlet port 65a are so set that more inflation gas flow toward the transverse center of the airbag in passing the opening 23a of the case 22 in the airbag 73. The gas outlet ports 65b, 65c and the small holes 65g help the inflation gas G to flow in the individual portions along the vehicle's transverse direction in the airbag 73, with the generally equal flow rate, and in the generally same directions, as shown in FIG. 8. The internal diameter of each of the small holes 65g is desirably 5 mm or under so as not to emit a lot of inflation gas, since they are located near the gas discharge ports 63c of the inflator body 63.

The cover portion 65e of the holding cylinder 65 is provided with a plurality of clamp portions 65k for clamping the inflator body 63. Each of the clamping portion 65k is formed by cutting two portions along the axial direction of the holding cylinder 65 and plastically deforming the portion to warp inward of the holding cylinder 65. The inflator body 63 is inserted into the insert hole 65d from the small diameter portion 63b, and the individual clamping portions 65k are pressed onto the outer circumference of the general portion 63a. Thus the inflator body 63 is held by the holding cylinder 65.

This inflator 62 is actuated simultaneously with a not-shown airbag device for the steering wheel 10 when the airbag actuating circuit mounted on the vehicle detects a frontal collision of the vehicle and signals through the lead wire 70.

The airbag 73 is formed of a flexible woven fabric of polyester, polyamide or the like, and has a generally rectangular plate shape as expanded and inflated completely, as indicated by the double-dotted lines in FIGS. 1 and 6. The airbag 73 is transversely wide enough to protect the both knees KL and KR of the driver MD as an occupant M. As shown in FIG. 3, the airbag 73 completely expanded and inflated is provided at the lower end side with two insert holes 73a and 73a and an insert hole 73b. The insert holes 73a and 73a are for inserting through individual bolts 66 of the inflator 62, and the insert hole 73b is for inserting through the body 63 of the inflator 62. The airbag 73 is attached to the case body 23 with the body 63 of the inflator 62 protruded from the insert hole 73b, and with the peripheral edges of the individual insert holes 73a clamped by the holding cylinder 65 and the bottom wall 25 of the case body 23.

The assembly of the airbag device S is now described. Here, the attachment portion 32 of the support member 27 are welded and secured to the side wall portion 24 of the case body 23 beforehand to form the case 22. To begin with, the inflator 62 is put in the airbag 73 so that the bolts 66 are protruded from the insert holes 73a and the end of the body 63 is protruded from the insert hole 73b, and then the airbag 73 is folded. Subsequently, the airbag 73 is wrapped around by a not-shown breakable wrapping film for keeping the folded-up shape. At this time, the bolts 66 and the end of the body 63 of the inflator 62 protruded from the insert holes 73a and 73b are taken out from the wrapping film.

Next, the inflator 62 is housed in the case body 23 together with the folded airbag 73, so that the individual bolts 66 of the inflator 62 are protruded from the insert holes 25a, and the end of the inflator body 63 is protruded from the insert hole 24c.

Then the airbag cover 46 is assembled with the case 22. More specifically, the upper side walls 49 of the airbag cover 46 are inserted into the individual through holes 30 in the support member 27, and the individual retaining pawls 34 are inserted into the retaining holes 49a in the individual upper side walls 49, so that the leading ends 34a retain the peripheral edges of the retaining holes 49a. Thereafter, the airbag cover 46 itself is turned and moved around the portion near the through holes 30 of the airbag cover 46, and the retaining projections 37 are inserted into the retaining holes 50a in the lower side wall 50. Then the holding member 43 is so placed that the individual insert portions 43d are inserted into the insert holes 37b of the protrusions 37a protruded from the lower side wall 50, and the bolts 66 are inserted through the individual holes 43b in the vertical plate portions 43a. If the bolts 66 protruded from the holding member 43 are fastened into the nuts 68, the assembly of the airbag cover 46 to the case 22 is completed, and thus the airbag module SA is formed.

Subsequently, the individual mounting portions 40 in the support member 27 in the airbag module SA are secured to the body 1 by means of the brackets 4, 5 and 6, and the connector 69 having the lead wire 70 connected to is connected to the body 63 of the inflator 62. As shown in FIGS. 1 and 2, thereafter, the airbag device S is mounted on the vehicle by installing the dashboard 19 and the under cover 20.

After the airbag device S is mounted on the vehicle, if an actuating signal is inputted to the body 63 of the inflator 62 through the lead wire 70, the inflation gas G is discharged from the gas discharge ports 63c of the inflator 62, and flows into the airbag 73 through the small holes 65g and the gas outlet ports 65a, 65b and 65c of the diffuser 64 (refer to FIG. 8). Then the airbag 73 inflating breaks the not-shown wrapping film, pushes the door portion 57 of the airbag cover 46, breaks the breakable portions 54, and opens the upper door 58 and the lower door 59 vertically on the hinge lines 55. Then the airbag 73 inflates and expands while protruding upward largely along the rear surface 17a of the column cover 17, as indicated by the double-dotted lines in FIGS. 1 and 6.

In the airbag device S of the embodiment, the vertical dimension w1 of the upper door 58 of the airbag cover 46 is so set as to close the gap D between the lower panel 19b as an interior decoration member and the general portion 47 of the airbag cover 46 which may be caused by the case 22 and the airbag cover 46 moving forward of the vehicle upon deployment of the airbag 73. As shown in FIG. 7, even if the great reaction force shifts the case 22 forward of the vehicle upon deployment of the airbag 73 to cause the gap D between the lower panel 19b and the airbag cover 46, the upper door 58 opened covers the gap D. Therefore, the airbag 73 inflates and expands while protruding rearward from the case opening 23a without going into this gap D.

In the airbag device S of the embodiment, the airbag 73 is enabled to deploy to properly protect the knees K of the occupant MD merely by setting the dimension of the upper door 58 of the airbag cover 46 as described above. In other words, the expanding property of the airbag 73 is improved by the design change of the upper door 58, not by stiffening the case 22 itself to suppress the movement of the case 22. As a result, the expanding property of the airbag 73 is improved without increasing the weight of the airbag device S.

Therefore, the airbag device S of the embodiment is able to protect the knees K of the occupant MD properly without having the airbag 73 expanding and inflating go in between the lower panel 19b as an interior decoration member and the airbag cover 46, while achieving the weight reduction.

Moreover in the airbag device S of the embodiment, the door portion 57 includes, below the upper door 58, the lower door 59 openable downward upon airbag 73 deployment. The two upper and lower doors 58 and 59 arranged up and down open simultaneously when the airbag 73 is deployed, thereby providing an opening quickly compared with the construction having only one door. As a result, the airbag 73 is able to expand quickly.

With the above construction, since the door portion 57 is composed of two members of the upper door 58 and the lower door 59, the substantial width of the door portion 57 in the longitudinal direction of the vehicle when opened is reduced. As a result, it is possible to suppress the degree of protrusion of the opened door portion 57 toward the occupant MD. Of course, if the vertical width of the case opening is small, and the door portion has a shortest possible vertical width to cover the gap D, the door portion may be formed of only one upward opening door. However, if the door portion has a vertical width greater than the opening width of the gap D formed upon deployment of the airbag 73, the door portion 57 is desirably composed of two members of the upper door 58 and the lower door 59.

In the airbag device S of the embodiment, the general portion 47 of the airbag cover 46 supports the vehicle's front side of the lower panel 19b as an interior decoration member arranged around the door arrangement portion 48 at the vehicle's front side of the lower panel 19b. Since the lower panel 19b is supported at the vehicle's front side face by the general portion 47 of the airbag cover 46, the lower panel 19b is prevented from depressing toward the vehicle's front side in normal time, thereby improving the appearance of the interior side of the vehicle. Without considering this point, of course, the general portion 47 of the airbag cover 46 may be arranged at the vehicle's rear side of the lower panel 19b, or may be arranged flush with the lower panel 19b at the vehicle's rear surface. Alternatively, an airbag cover including only a door arrangement portion but not a general portion may be employed.

Figure 9:
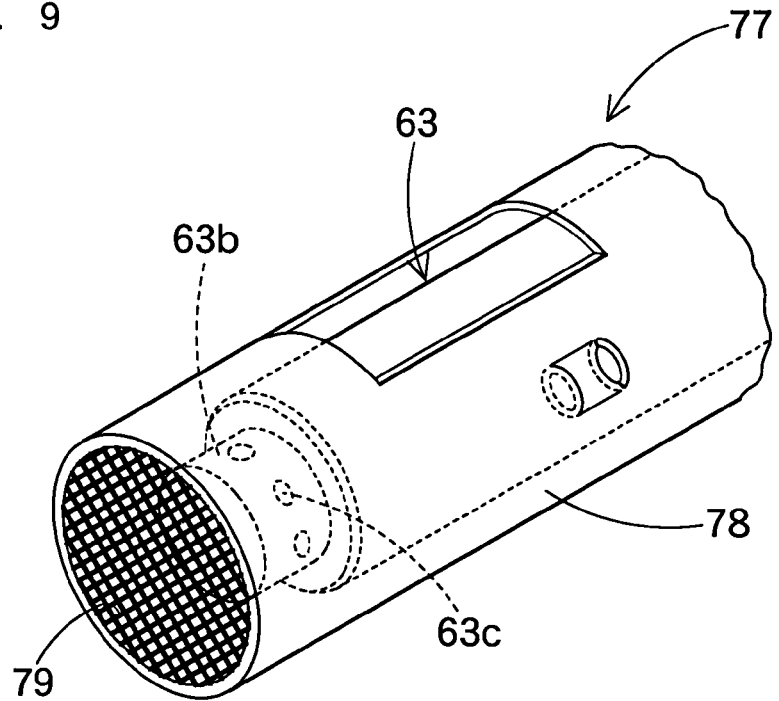
FIG. 9 is a schematic enlarged perspective view of the vicinity of the gas discharge ports of the inflator used in a modification of the knee protection airbag device according to the present invention.
Figure 10:
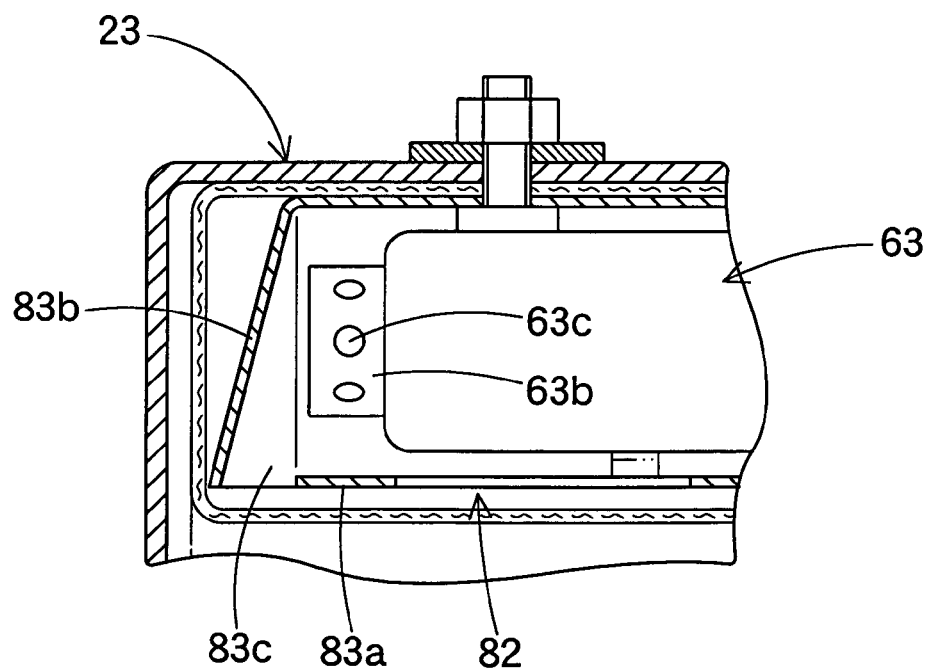
FIG. 10 is a schematic enlarged section of yet another modification of the knee protection airbag device according to the present invention, particularly showing the vicinity of the gas discharge ports of the inflator.

In the foregoing embodiment of the airbag device S, the diffuser 64 includes the small holes 65g in the cover portion 65e near the gas discharge ports 63c. However, the shape of the holding cylinder 65 of the diffuser 64 is not limited to this. For example, the diffuser may include a meshy cover portion 79 at the end of the holding cylinder 78 near the small diameter portion 63b, as the diffuser 77 shown in FIG. 9. Alternatively, the diffuser may have the covering end face 83b spreading out rearward of the vehicle, and include a slit 83c at the vehicle's rear side of the covering cylinder 83a near the covering end face 83b, as the diffuser 82 shown in FIG. 10. The diffusers 77 and 82 are able to emit such amount of gas as not to damage the airbag 73 from the cover portion 79 or the slit 83c, and are able to help the inflation gas to flow in the individual portions along the vehicle's transverse direction in the airbag 73, with the generally equal flow rate, and in the generally same directions, cooperatively with the gas outlet ports.

The foregoing embodiment has taken the airbag device S arranged in front of the driver MD as the occupant M for protecting the knees K of the driver MD as an example. However, the airbag device constructed as above may be arranged in front of an occupant seated in the front passenger's seat for protecting the knees of the occupant seated in the front passenger's seat.

In the foregoing embodiment of the airbag device S, moreover, the lower panel 19b of the dashboard 19 is arranged around the airbag cover 46 as an interior decoration member. However, the interior decoration member arranged around the airbag cover 46 is not limited to this, but the upper panel 19a of the dashboard 19, or the door portion of a glove box located in front of the front passenger's seat may be arranged instead of the lower panel 19b.

What is claimed is:

1. A knee protecting airbag device arranged below a steering column of a vehicle, the device comprising:
   an airbag;
   a case attached to the vehicle for housing the airbag, wherein the case has a recessed section at a front side thereof, the case being arranged directly below the steering column, the case further being arranged apart from the steering column before the airbag is inflated, the recessed section being arranged substantially at a lateral center of the case to indent a portion of the case near an upper and front-side corner of the case;
   an inflator attached to the case for inflating the airbag;
   an airbag cover assembled with the case and including a door portion covering the opening of the case; and
   an interior decoration member for the vehicle provided separate from the airbag cover, wherein the case is arranged at a front side of the vehicle with respect to the interior decoration member, wherein the airbag cover and the interior decoration member are flush and form a continuous surface in a direction facing a rear side surface of the vehicle while the airbag is in an unoperated state; and
   a steering column cover for covering the steering column, the steering column cover being provided separately from the interior decoration member.

2. The knee protecting airbag device according to claim 1, wherein:
   the case opens toward the rear of the vehicle and houses the inflator;
   the door portion is adapted to open upon deployment of the airbag; and
   the door portion includes at least an upper door that opens upwardly; wherein the interior decoration member is arranged around the airbag cover, and the airbag, upon inflow of inflation gas from the inflator, pushes open the door portion and expands and inflates upward while protruding toward the rear of the vehicle, and the dimensions of the upper door are such that a gap formed between the interior decoration member and the airbag cover is covered when the airbag is deployed.

3. A knee protection airbag device arranged in front of the knees of a seated vehicle occupant, the airbag device comprising:
   a case for housing an airbag and an inflator, the case being secured to the vehicle body and being opened rearward;
   an inflator for supplying the airbag with inflation gas;
   an airbag folded and housed in the case, the airbag, when fed with inflation gas by the inflator, protruding rearward from the opening of the case and expanding upward; and
   an airbag cover assembled with the case for covering the opening of the case, the airbag cover being surrounded by an interior decoration member of the vehicle in a lower region of the interior decoration member, the airbag cover being inclined such that the upper end thereof is located rearward than the lower end thereof as viewed from the side, and in an unoperated state, the airbag cover and the interior decoration member being flush at the vehicle's rear side surface, the airbag cover comprising an upward-opening door through which the airbag protrudes from, the door being opened when pushed by the inflating airbag, wherein:
   when the airbag device is actuated, the airbag device moves forward of the vehicle as a whole such that the upper end of the airbag cover and the interior decoration member are separated from each other in the front-rear direction in such a manner as to provide a gap therebetween; and
   the upward-opening door of the airbag cover opens and abuts against the interior decoration member and covers the gap, whereby the airbag is prevented from entering into the gap.

4. The knee protection airbag device according to claim 3, wherein the airbag cover further comprises a downward-opening door openable downward upon airbag deployment, below the upward-opening door.

5. The knee protection airbag device according to claim 3, wherein the airbag cover comprises a general portion located around the door for supporting the interior decoration member from the vehicle's front side.

* * * * *